Figure 1:
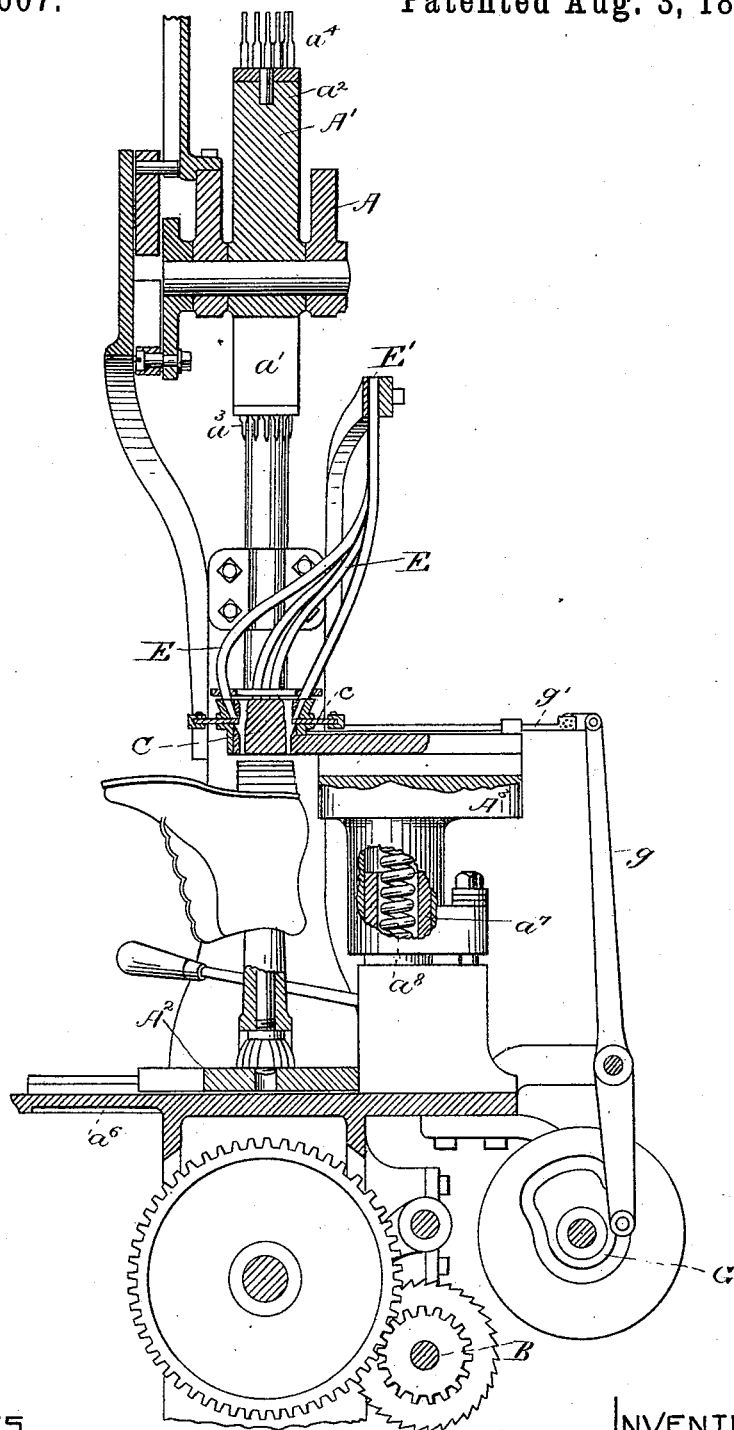

(No Model.) F. F. RAYMOND, 2d. 5 Sheets—Sheet 3.
HEEL NAILING MACHINE.

No. 346,607. Patented Aug. 3, 1886.

WITNESSES
Frank G. Parker
Fred. B. Dolan

INVENTOR
F. F. Raymond (No Model.) 5 Sheets—Sheet 4.

F. F. RAYMOND, 2d.
HEEL NAILING MACHINE.

No. 346,607. Patented Aug. 3, 1886.

WITNESSES
Frank G. Parker
Fred B. Dolan

INVENTOR
F. F. Raymond (No Model.)

F. F. RAYMOND, 2d.

HEEL NAILING MACHINE.

No. 346,607.

5 Sheets—Sheet 5.

Patented Aug. 3, 1886.

WITNESSES
Frank G. Parker
Fred B. Dolan

INVENTOR
F. F. Raymond

UNITED STATES PATENT OFFICE.

FREEBORN F. RAYMOND, 2D, OF NEWTON, MASSACHUSETTS.

HEEL-NAILING MACHINE.

SPECIFICATION forming part of Letters Patent No. 346,607, dated August 3, 1886.

Application filed July 20, 1885. Serial No. 172,095. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Heel-Nailing Machines, of which the following is a full, clear, and exact description, reference being had to the accompanying drawings, forming a part of this specification, in explaining its nature.

The invention is an improvement upon that described in my patent numbered 317,851.

The invention relates especially to means for automatically feeding attaching-nails to the templet, and in a position to be driven by the drivers without the use of an intermediate nail-carrier, and I have represented in the drawings a movable and a stationary templet or pressure plate.

Figure 2:
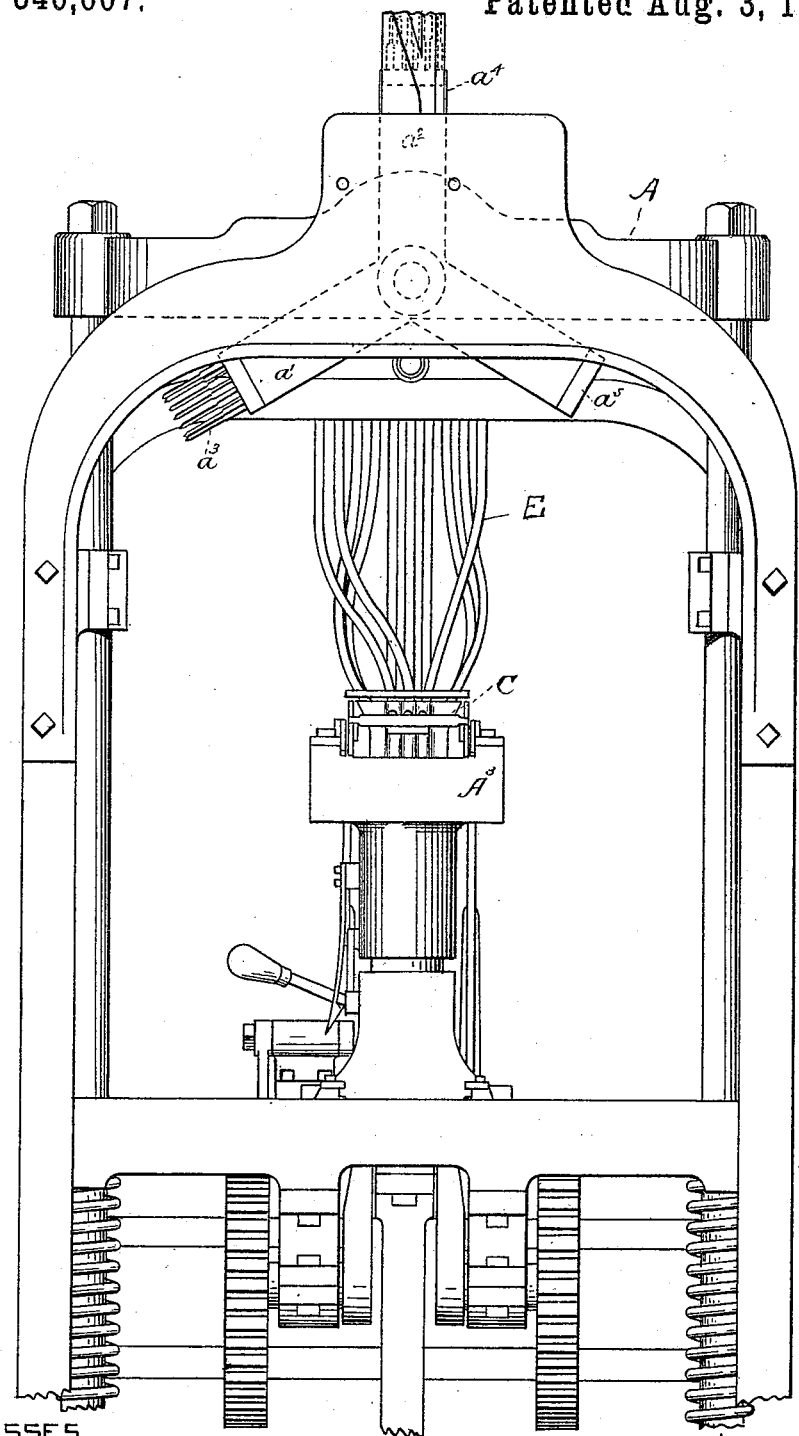
Figure 3:
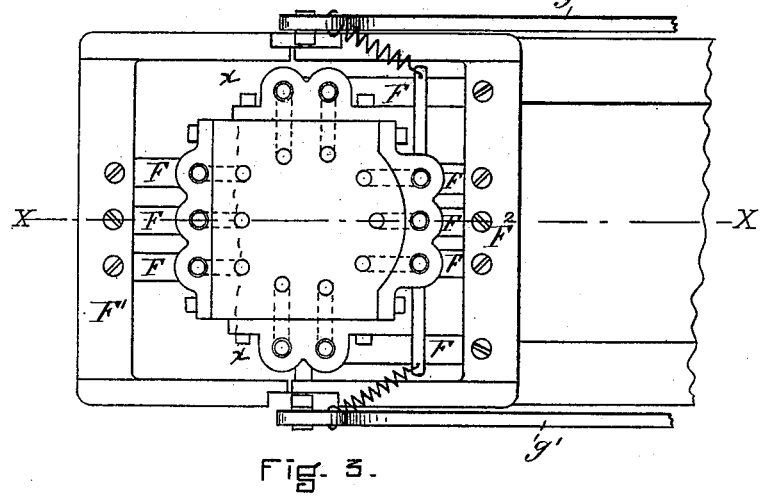
Figure 4:
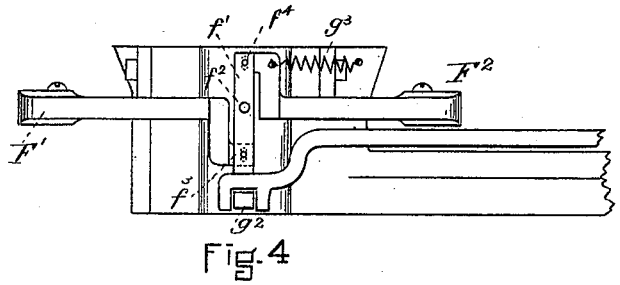
Figures 5, 10:
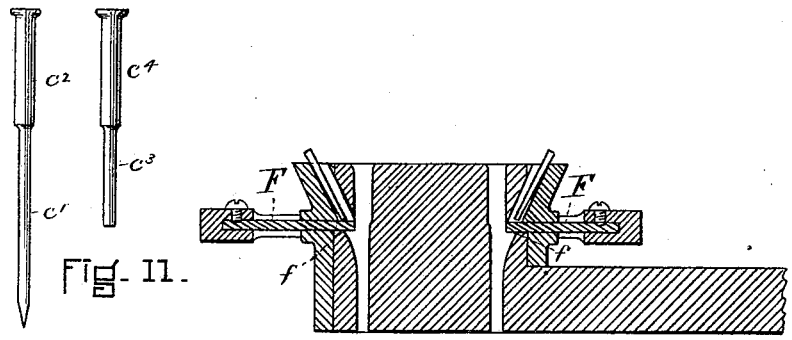
Figure 6:
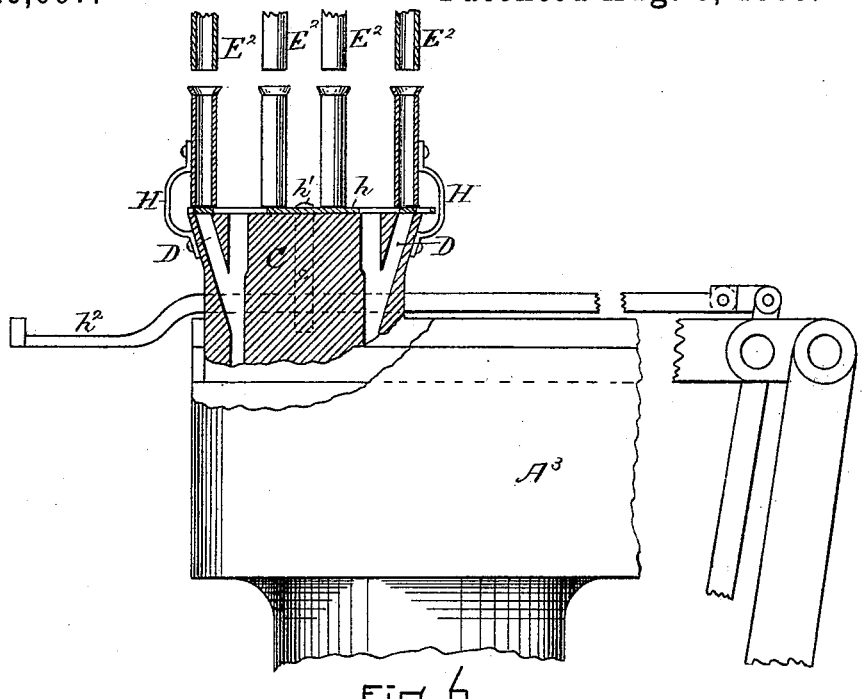
Figure 7:
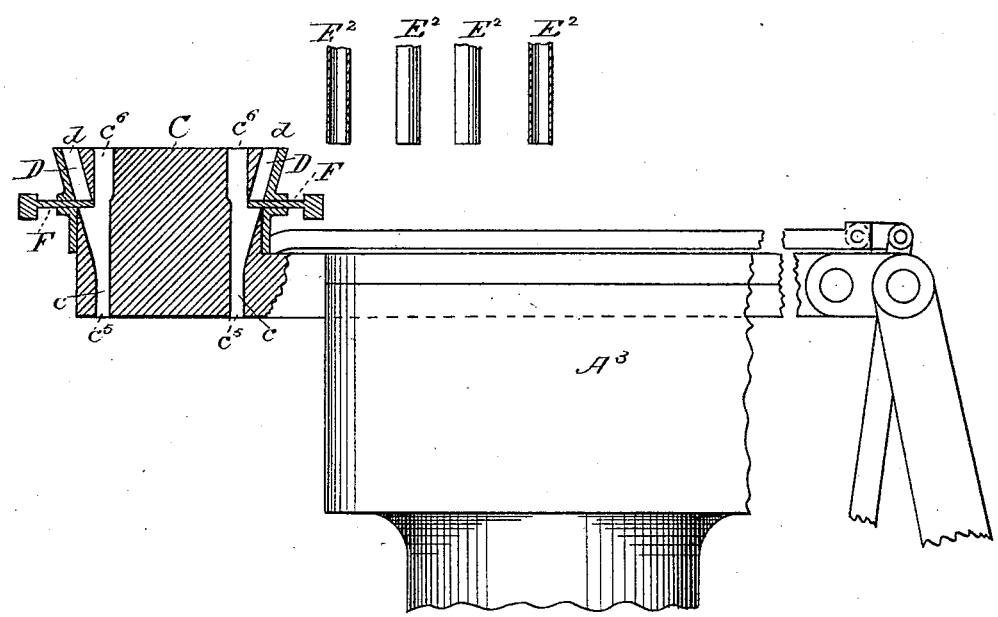
Figure 8:
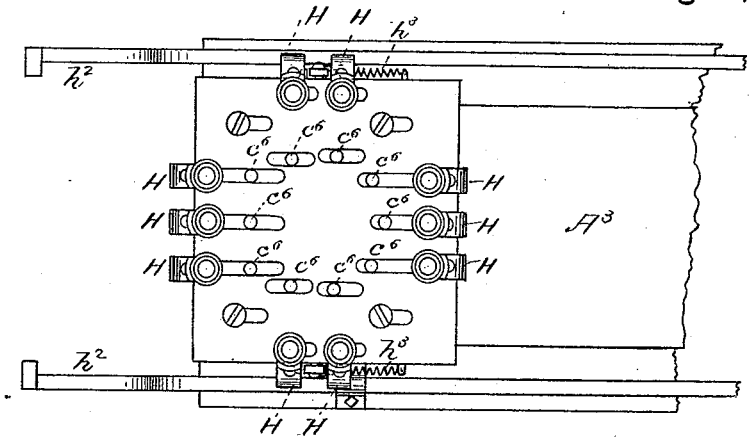
Figure 9:
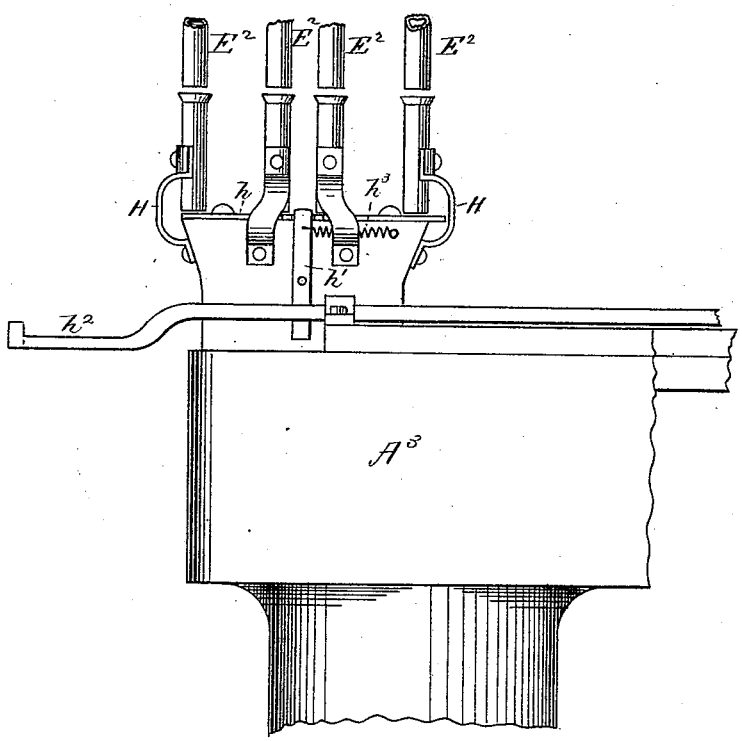

In the drawings, Figure 1 is a view, part in vertical section and part in elevation, of the central and upper parts of a heel-nailing machine provided with my invention. Fig. 2 is a front elevation thereof. Fig. 3 is a plan view enlarged of the templet. Fig. 4 is a side elevation thereof. Fig. 5 is a vertical central section thereof. Fig. 6 is a view of the templet, a portion thereof being broken out, showing the construction and also of the carriage for supporting the same. Fig. 7 is a view, part in section and part in elevation, of a templet and carriage supporting the same and supplying-tubes, to which reference is hereinafter made. Fig. 8 is a plan view, and Fig. 9 a view in side elevation further representing the construction shown in Fig. 6. Fig. 10 is an elevation of an awl such as I prefer to use; Fig. 11, an elevation of a driver.

Whether the templet-plate be movable or stationary, it is constructed or made substantially as follows—that is, it is made considerably thicker than the ordinary templet-plate. It has holes in which the drivers are reciprocated, and in addition nail-feeding holes which enter the driver-holes and afford means for feeding the nails to a position to be driven.

In the drawings I have represented the improvement as applied to a heel-nailing machine containing many of the features of the so-called "National" machine; and A represents the cross-head which carries the revolving head A'. The cross-head is reciprocated substantially as described in the Henderson patent, No. 316,894, although any other suitable means may be used. The revolving head is preferably automatically revolved, as described in the Henderson and Raymond patent, No. 317,647, although I do not confine myself to this especial means of turning it. It has the arms $a'$ and $a^2$, carrying, respectively, a block supporting a gang or group of awls, $a^3$, a block supporting a gang or group of drivers, $a^4$, and a spanker-arm, $a^5$.

$A^2$ is the jack or work-support, which is adapted to be moved horizontally upon the bed $a^6$.

$A^3$ is the carriage supporting the templet. It is vertically movable downward upon its post $a^7$ against the pressure of the spring $a^8$.

B is the pulley-shaft.

C is the templet. It has the holes $c$, which are of considerable depth, and which are straight. They are arranged in the order in which it is desired the attaching-nails shall be driven, and they receive the awls $a^3$ and the drivers $a^4$. These awls and drivers, on account of the length of the holes $c$, are preferably made as represented in Figs. 10 and 11—that is, the awls have the sections $c'$, of the size and length of the holes which it is desired to form, and the enlarged sections $c^2$, which fit the bore of the upper portion of the holes $c$, and the drivers have the portions or sections $c^3$, which fit the bore of the lower sections of the holes $c$, and the upper sections $c^4$, which are made to fit the bore of the upper parts of the holes $c$. This construction is for the purpose of giving the awls and drivers sufficient strength.

From what I have said it will be seen that the holes $c$ have the lower sections, $c^5$, of a smaller bore than the upper sections $c^6$. There are arranged to open into these holes $c$ the passages D, which are somewhat inclined outwardly from the holes $c$, so as to bring their mouths or openings $d$ outside the openings to the holes $c$, and these passages are of sufficient size and so arranged in relation to the holes $c$ as to permit of the feeding of the attaching-nails through them to the holes $c$; and they are also arranged in relation to such holes to allow sufficient space in the portions of the holes $c$ below their line of entrance thereto, as to permit the nails, after they have been fed, to take a vertical or upright position in the holes in order that they may be properly driven. This construction, it will be seen, provides the templet with two sets of holes: first, the holes $c$, through which the awls and drivers are driven, and the lower portions of which receive the attaching-nails, and, second, the nail-feeding holes or passages through which the attaching-nails are fed to the holes $c$. This templet is adapted to be used in three ways. First, the awls may be driven and withdrawn and the nails fed by hand through the passages D into the holes $c$, and the drivers then reciprocated; second, it may be stationary and the holes or passages D supplied with nails by means of the tubes or nail-conveyers E, extending to the source of supply E', and in Fig. 1 I have represented this construction, the nails being fed through the tubes E from a distributer, which may be like that described in my Patents Nos. 317,851 and 317,199, or like that which I shall describe in an application about to be made. When this method of supplying the nails is used, the tubes E are bent and inclined so that they do not interfere or come in the line of reciprocation of the arms of the revolving head carrying the awls, drivers, and spanker, and the cross-head is lifted or raised from the templet-plate sufficiently to permit the proper inclination to be given the tubes, and the arms supporting the awls, drivers, and spanker are made correspondingly longer.

The third way in which the templet is used is that represented in Figs. 6 and 7. It is there shown as made movable horizontally and as adapted to receive nails from the nail-supplying tubes or passages $E^2$, and when it is thus made I form in each of the passages D a valve for closing and opening the same automatically, in order that the attaching-nails may be held in the passages D after they have been received from the nail-supplying tubes and while the templet is being moved forward into position and until the awls have been driven and withdrawn, when the passages are automatically opened and the nails allowed to escape therefrom into the passages $c$.

In Figs. 3, 4, 5, and 7 I have represented the device for opening and closing the passages as consisting of the plates F, one for each of the passages D, which are arranged to project through the holes or openings $f$ extending into the passages. These plates are carried by two bars or supports, F' F$^2$, the first of which supports or carries those in front of the line $x$ $x$, Fig. 3, and the second those at the rear, and these bars or supports are given a movement toward and from each other by means of the lever $f'$, which is pivoted at $f^2$, and which is connected at the point $f^3$ with the forward bar or support, F', and at the point $f^4$ to the rear bar or support, F$^2$, and upon the movement of this lever in one direction the plates attached to the forward bar are moved forward to open the holes in the passages D, and the plates attached to the rear bar are moved backward to open the rear passages D. The lever is automatically moved at the proper interval of time—namely, after the awls have been driven and withdrawn—by means of the cam G upon the cam-shaft, and a lever, $g$, operating the pull bar or rod $g'$, which engages with the end $g^2$ of the lever and draws it backward to move the bars or supports to open the passages, and after the nails have been fed to the holes $c$ the push-bar is returned by the cam to its original position, which permits the spring $g^3$ to return the lever to its original position, and therefore the bars and plates which they carry. In lieu of this device for closing the plates, I may extend the passages D above the upper surface of the templet, as shown in Fig. 6, by means of tubes or a block having its center removed and passages formed therein to connect with or form part of the passages D, and when the tubes are used I prefer to support them by arms or brackets H, extending from the tubes downward to the sides of the templet. When this construction is employed I prefer to use a sliding plate, $h$, for opening and closing the holes or passages D, and this plate may be operated by the lever $h'$ and pull-rod $h^2$, a cam, and the spring $h^3$, as above described, and I have shown this construction in Fig. 6. When the templet is made horizontally movable, I arrange the feeding tubes or passages for supplying the attaching-nails substantially as shown in Fig. 7.

In operation, the templet, if horizontally movable, is moved into operative position after the passages D have been loaded with nails. The jack or work-support is then moved under the same, the awls reciprocated to form the holes in the heel-blank and to move the templet down upon the heel-blank to compress it. The awls are then withdrawn and the attaching-nails discharged from the passages or holders D into the driving-holes $c$ and the drivers reciprocated. The spanker is then brought into operative position and reciprocated. Any suitable top-lift holding and attaching device may be used. When the templet is stationary and the tubes E are used, it will be desirable to employ the device for closing the passages D, in order that a group of nails may be fed downward through the passages to a position for immediate delivery into the holes $c$ after the awls have been withdrawn. It will be seen that where the templet is made movable the passages D also serve as nail holders or carriers.

Having thus fully described my invention, I claim and desire to secure by Letters Patent of the United States—

1. In a heel-nailing machine, a templet comprising a solid block of metal having holes $c$ formed therein upon a line parallel with the edge of a heel, and nail-supply passages D, opening into said holes $c$ and formed in the templet-blocks and suitable cut-offs, all substantially as and for the purposes described.

2. In a heel-nailing machine, the templet formed of a solid block of metal, and having the holes *c* arranged upon a line substantially parallel with the edge of a heel, with a series of nail-holders carried thereby, arranged to open into the holes *c* through the passages D, and suitable cut-offs, substantially as described.

3. In a heel-nailing machine, a templet comprising a solid block of metal having the holes *c* formed therein, the nail-holders having the passages D entering the holes *c*, and slides for opening and closing the said passages D, substantially as described.

4. In a heel-nailing machine, a templet, C, having the holes *c*, the nail-delivery passages D, slides for opening and closing said passages, and a cam connected with said slides for moving them automatically at stated intervals, substantially as described.

5. In a heel-nailing machine, the combination of a templet made of a solid block of metal, and having holes *c* formed therein on a line substantially parallel with the edge of a heel, the passages D opening into said holes *c*, and arranged upon a line parallel with the holes *c*, the nail-supply tubes or channels E, having their outlets arranged upon a line corresponding to that of the passages D, substantially as described.

6. The combination, in a heel-nailing machine, of a templet having holes or pockets D, arranged to enter the holes of the templet, with a sliding plate, F, for opening and closing each pocket, the cam G, lever $g'$, slide-rod $g$, lever $f'$, and bars or supports $F'$ $F^2$, substantially as described.

7. The combination of the nail-holder passages D, plates F, their supports $F'$ $F^2$, the lever $f'$, pivoted as described, and the spring $g^3$ and movable bar $g'$, all substantially as set forth.

FREEBORN F. RAYMOND, 2D.

Witnesses:
E. A. PHALEN,
FRED. B. DOLAN.